United States Patent [19]
Tae-Sig

[11] Patent Number: 5,432,416
[45] Date of Patent: Jul. 11, 1995

[54] DRIVING APPARATUS FOR ROBOT

[75] Inventor: Kim Tae-Sig, Suwon, Rep. of Korea

[73] Assignee: Samsung Electronics Co., Ltd., Suwon, Rep. of Korea

[21] Appl. No.: 125,695

[22] Filed: Sep. 24, 1993

[30] Foreign Application Priority Data

Sep. 30, 1992 [KR] Rep. of Korea ............... 92-17959

[51] Int. Cl.⁶ .................. B62D 1/28; G06F 15/50; A63H 17/00
[52] U.S. Cl. .................. 318/568.12; 318/587; 446/463; 364/424.02
[58] Field of Search .............. 318/138, 560–646; 364/424.02, 424.03, 426; 180/167–169, 79; 15/319, 339; 446/437–463, 90; 901/1, 3, 5, 7, 9

[56] References Cited

U.S. PATENT DOCUMENTS

| | | | |
|---|---|---|---|
| 4,306,329 | 12/1981 | Yokoi | 180/79 |
| 4,530,056 | 7/1985 | Mackinnon et al. | 364/424 |
| 4,533,998 | 8/1985 | Falamak | 180/168 |
| 4,736,826 | 4/1988 | White et al. | 901/1 X |
| 4,823,632 | 4/1989 | Harrod et al. | 446/469 |
| 4,829,442 | 5/1989 | Kadonoff et al. | 364/449 |
| 4,846,758 | 7/1989 | Chou | 446/437 |
| 4,869,700 | 9/1989 | Reiling, Jr. et al. | 446/90 |
| 4,878,877 | 11/1989 | Auer et al. | 446/463 |

Primary Examiner—Paul Ip
Attorney, Agent, or Firm—Burns, Doane, Swecker & Mathis

[57] ABSTRACT

A self-propelled robot has a robot body on which a drive wheel is mounted. The drive wheel is connected to a member that can be turned about a vertical axis for steering the robot. A propulsion drive mechanism is mounted on that member for transmitting a propulsion drive to the drive wheel. The propulsion drive mechanism includes a clutch mechanism for disengaging the propulsion drive when the drive wheel encounters excessive resistance to travel. The clutch mechanism includes a spring biased clutch element mounted on an internal spline shaft of the drive wheel.

13 Claims, 9 Drawing Sheets

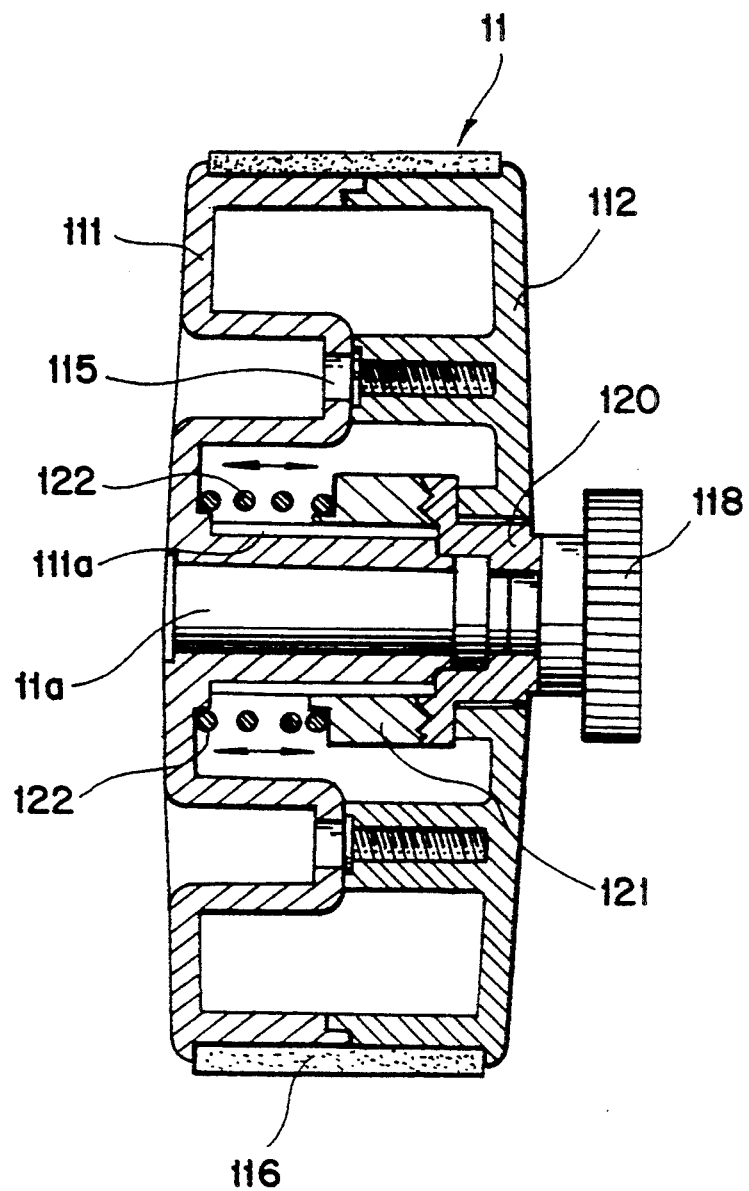

DRIVING APPARATUS FOR ROBOT

BACKGROUND OF THE INVENTION

1. Field of the Invention

The present invention relates to an apparatus for driving a self-propelled robot.

2. Description of the Prior Art

FIG. 1 illustrates a conventional driving apparatus employed in a robot. The driving apparatus includes a drive shaft 2 rotatably mounted at both ends thereof to bracket members 1a fixed to a bottom surface of a robot body 1 of the robot. A drive wheel 4 is fixedly mounted on the drive shaft 2. A first gear 3 is also fixedly mounted on the drive shaft 2 at one side of the drive wheel 4. The first gear 3 receives a drive force from a drive motor 5 so as to rotate the drive wheel 4.

In other words, the drive force from the drive motor 5 is transmitted to a worm 5a integrally formed with a rotation shaft of the drive motor 5, thereby causing the worm 5a to rotate clockwise or anticlockwise. By the rotation of the worm 5a, a gear 7 which is engaged with the worm 5a is rotated. The rotation of gear 7 causes a rotation of a second gear 6 which is concentrically fixed to the gear 7 and engaged with the first gear 3. As a result, the first gear 3 rotates, so that the drive wheel 4 rotates to move the robot forward and backward.

Since a plurality of drive wheels 4 are provided at the bottom surface of robot body 10, such a conventional robot driving apparatus actually needs individual driving units for driving the drive wheels 4. As a result, the conventional robot driving apparatus has a problem of an increase in manufacture cost, because of its complex overall construction and its complicated assembling work.

Where an overload such as an impact is externally applied to the robot driving apparatus, it is directly transmitted to the drive motor. As a result, the drive motor may be frequently out of order. In severe cases, the worm 5a and the gear 7 may be damaged, thereby causing the robot to be disabled.

SUMMARY OF THE INVENTION

Therefore, the present invention has been made in view of the above-mentioned problems encountered in the prior art and an object of the invention is to provide a driving apparatus for a robot which is simple in construction, thereby enabling the assembling work to be easy and the manufacture cost to be reduced.

Another object of the invention is to provide a driving apparatus for a robot capable of coping with an overload such as an impact externally applied and achieving a precise operation.

In accordance with the present invention, these objects can be accomplished by proving in a self-propelled robot capable of moving forwards and backwards and changing its direction, an apparatus for driving said robot comprising: a base plate fixedly mounted in a robot body of the robot; a cover member rotatably mounted to a lower portion of said base plate; a ring gear disposed above the base plate and fixedly mounted on said cover member to rotate integrally with the cover member; a drive wheel rotatably mounted to a lower portion of the cover plate by a shaft rotatably mounted to said cover plate lower portion; direction change means for rotating said ring gear to turn said drive wheel; and drive means for driving the drive wheel forwards and backwards.

BRIEF DESCRIPTION OF THE DRAWINGS

Other objects and aspects of the invention will become apparent from the following description of embodiments with reference to the accompanying drawings in which:

FIG. 7 is a sectional view of the drive wheel, showing an assembled condition thereof;

DETAILED DESCRIPTION OF THE PREFERRED EMBODIMENTS

Figure 1:
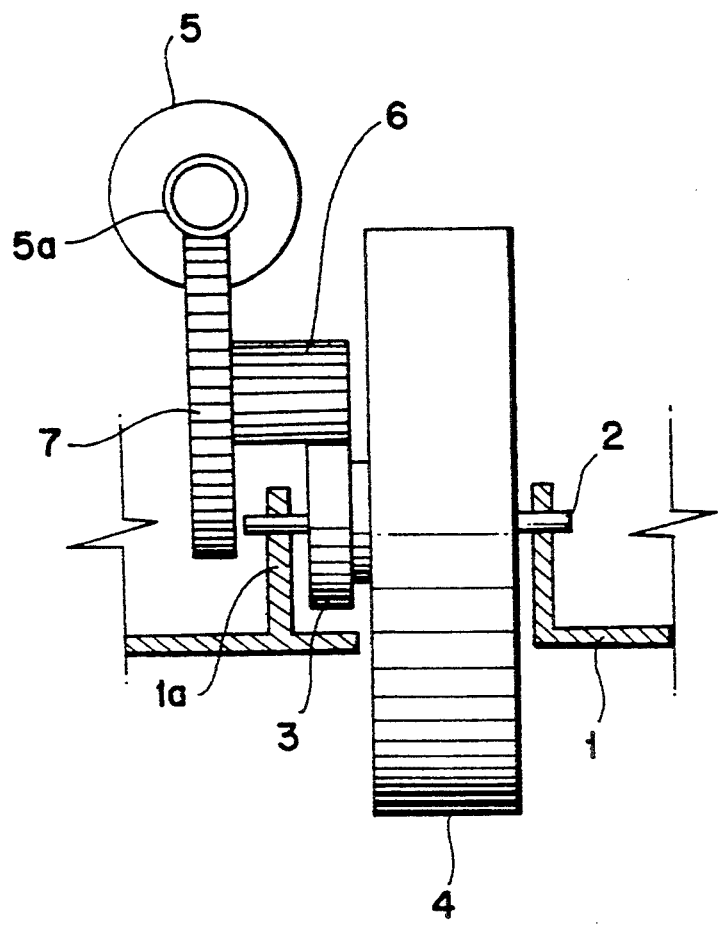
FIG. 1 is a partial sectional view of a conventional apparatus for driving a robot.
Figure 2A:
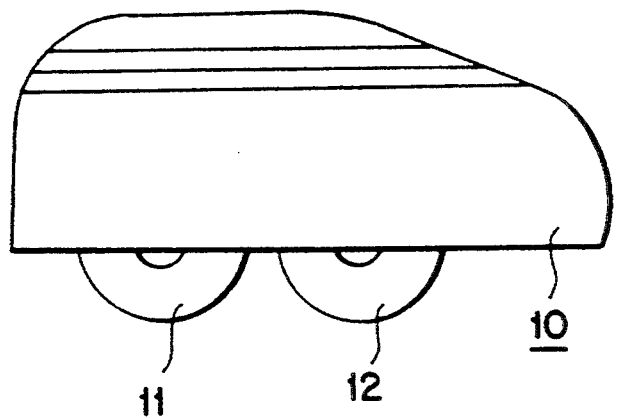
FIG. 2A is a side view of a robot to which the present invention is applied.
Figure 2B:
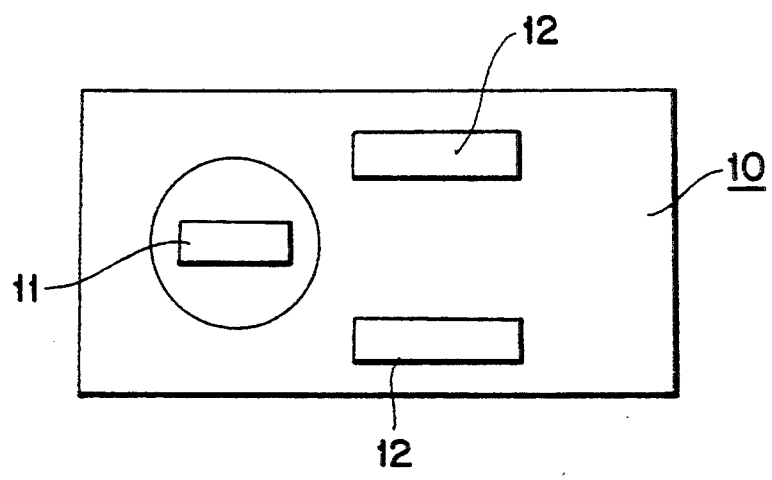
FIG. 2B is a bottom view of the robot shown in FIG. 2A.

FIGS. 2A and 2B show a robot to which the present invention is applied. The robot comprises a robot body 10. A drive wheel 11 is mounted to the bottom surface of the robot body 10 by means of a shaft 11a. The drive wheel 11 can change its direction and can be driven forward and backward by virtue of operations of direction change unit 15 and drive unit 16 (not shown in FIGS. 2A and 2B) which will be described hereinafter. In front of the drive wheel 11, a pair of casters 12 are rotatably mounted to the robot body 10, by means of brackets fixed to the robot body 10 and shafts mounted to the brackets, respectively. By the direction change and the forward and backward drive of the drive wheel 11, the casters 12 carry out the same operations as the drive wheel 11.

Figure 3:
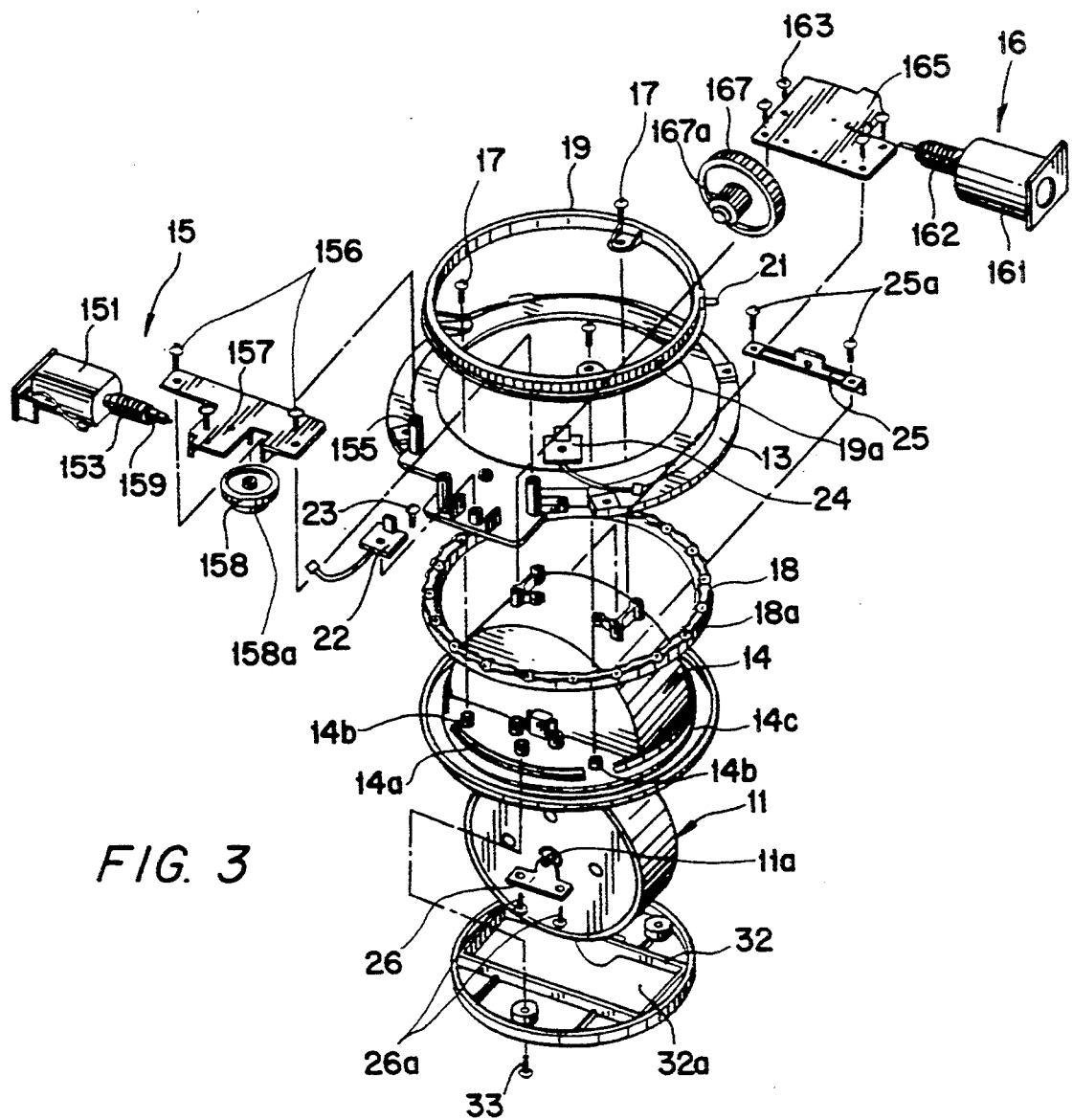
FIG. 3 is an exploded perspective view of a robot driving apparatus in accordance with an embodiment of the present invention.
Figure 4:
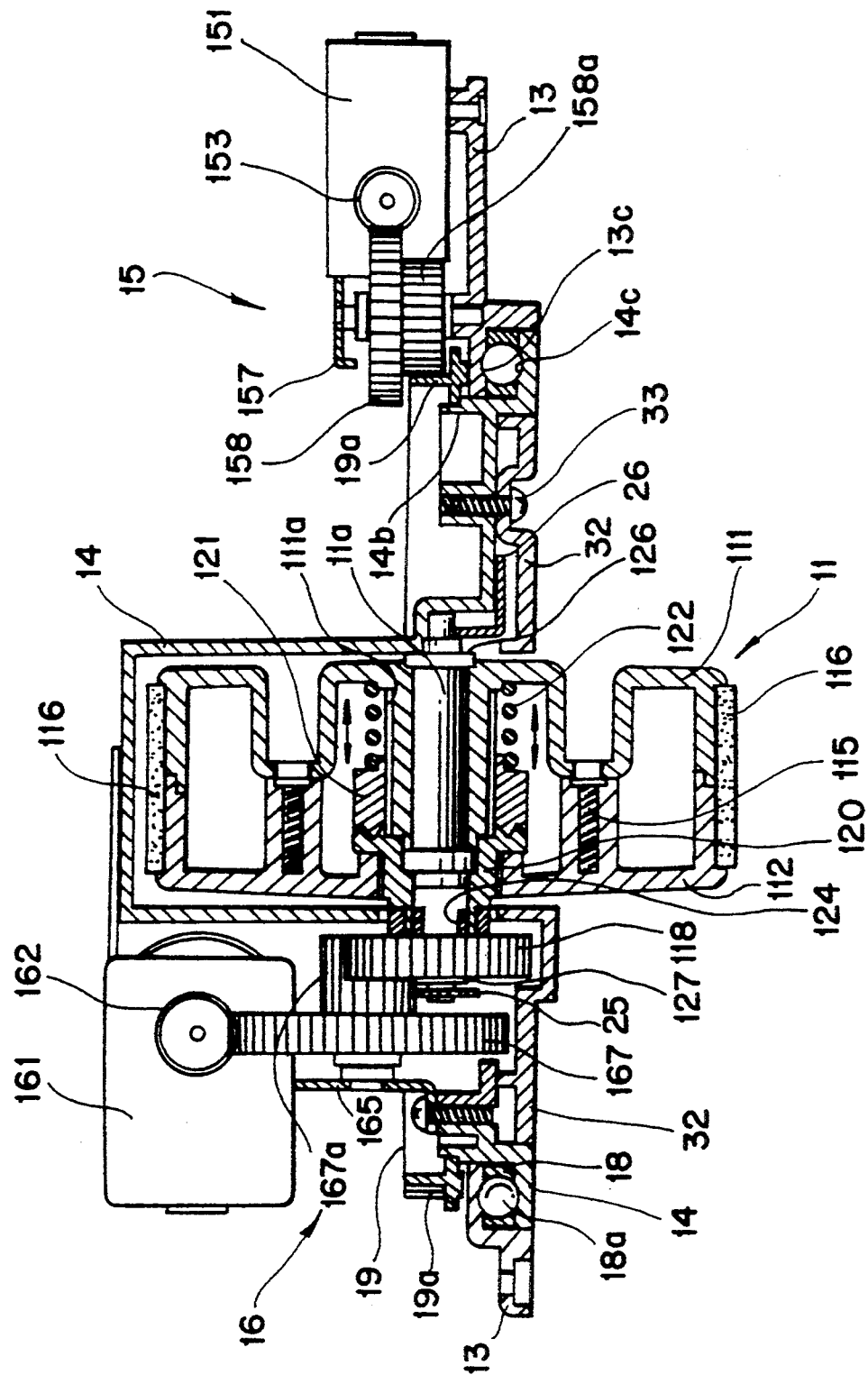
FIG. 4 is a sectional view of the robot driving apparatus in accordance with the embodiment of the present invention.
Figure 5:
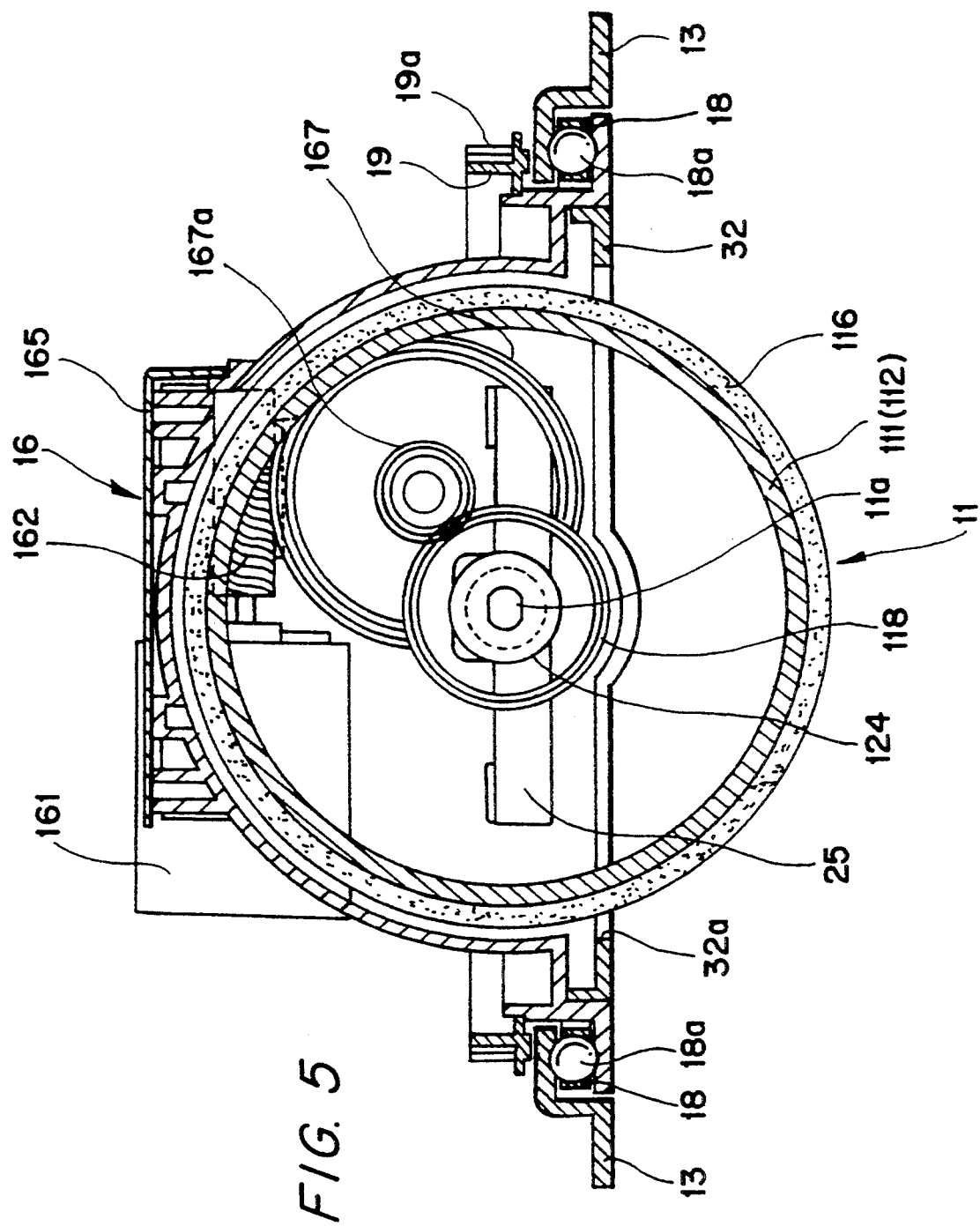
FIG. 5 is a cross-sectional view taken along the line A—A' of FIG. 4.

FIGS. 3 to 5 illustrate an apparatus for driving the robot in accordance with an embodiment of the present invention. As shown in FIGS. 3 to 5, a base plate 13 is attached to the bottom surface of the robot body 10. A cover member 14 is rotatably mounted beneath and to the base plate 13. The cover member 14 supports rotatably the drive wheel 11 by means of the shaft 11a mounted to the cover member 14. On the base plate 13, the direction change unit 15 is disposed which serves to change the direction of the drive wheel 11. Adjacent to the cover member 14, the drive unit 16 is disposed which serves to drive the drive wheel 11 forward and backward. The drive unit 16 is supported to the shaft 11a by means of support brackets 25 and 26.

The base plate 13 is a stepped ring member having a central opening, an inner ring portion, and an outer ring portion. The cover member 14 is of a configuration having a wheel covering portion receiving the drive wheel 11 and a circular plate portion. The wheel covering portion of cover member 14 is upwardly protruded through the central opening of base plate 13. The cover member 14 also has an annular vertical wall 14a which is in contact with the inner peripheral edge of the base plate 13 defining the central opening so that the cover member 14 can rotate about the base plate 13.

A retainer 18 having a plurality of spaced balls 18a is fitted in a space defined between the lower surface of the inner ring portion of base plate 13 and the upper surface of the circular plate portion of cover member 14. The cover member 14 also has at its circular plate portion a plurality of protrusions 14b which mounts fixedly a ring gear 19 to the cover member 14 by means of set screws 17. The ring gear 19 rotates integrally with the cover member 14 and has a plurality of teeth 19a at its outer peripheral surface.

A pair of guide grooves 13c and 14c are formed at the lower surface of the inner ring portion of base plate 13 and the upper surface of the circular plate portion of cover member 14, respectively. The guide grooves 13c and 14c serve to guide a rolling of balls 18a and prevent a separation of the balls 18a.

A magnet 21 is attached to the ring gear 19. For detecting a magnetic line of force generated from the magnet 21, a position sensor 24 is attached to the base plate 13 by means of set screws. The position sensor 24 detects the turn angle of the drive wheel 11 by detecting the magnetic line of force from the magnet 21.

The direction change unit 15 comprises a DC motor 151 which rotates normally and reversely, and a worm 153 fixedly mounted on a motor shaft of the DC motor 151. To support the DC motor 151, a pair of brackets 157 are fixedly mounted to a pair of protrusions 155 protruded from one side portion of the base plate 13 by means of set screws 156, respectively. The direction change unit 15 further comprises a gear 158 engaged with the worm 153 rotating according to the rotation of DC motor 151. The gear 158 has a smaller gear 158a engaged with the teeth 19a of ring gear 19 so as to change the direction of the drive wheel 11. A magnet 159 is attached to an end of the worm 153 away from the DC motor 151.

A revolution sensor 22 is fixedly mounted to the base plate 13 by means of set screws 23 such that it is spaced an appreciate distance from the magnet 159 attached to the worm 153. The revolution sensor 159 and thus revolutions of the worm 153 according to the driving of the DC motor 151 and sends a signal indicative of the revolutions of the worm 153 to a controller not shown, to sense the turn angle of the drive wheel 11.

The drive unit 16 which rotates the drive wheel 11 in clockwise and in anticlockwise to move the robot forward and backward comprises a DC motor 161 rotating normally forwardly and reversely, and a worm 162 fixedly mounted on a motor shaft of the DC motor 161. To support the DC motor 161, a bracket 165 is fixedly mounted to one side portion of the cover member 14 by means of set screws 163. The drive unit 16 further comprises a gear 167 engaged with the worm 162 rotating according to the rotation of DC motor 161. The gear 167 has a smaller gear 167a operatively connected with the shaft 11a of the drive wheel 11 so as to drive the drive wheel 11 normally and reversely.

The shaft 11a supporting the drive wheel 11 is supported at one end thereof by a bracket 25 which is fixedly mounted on the upper surface of the circular plate portion of cover member 14 by means of set screws 25a and at the other end thereof by a bracket 26 which is fixedly mounted on the lower surface of the circular plate portion of cover member 14 by means of set screws 26a.

A cover 32 is attached to the lower surface of the cover member 14 by means of set screws 33 and provided with an opening 32a for partially receiving the drive wheel 11.

Figure 6:
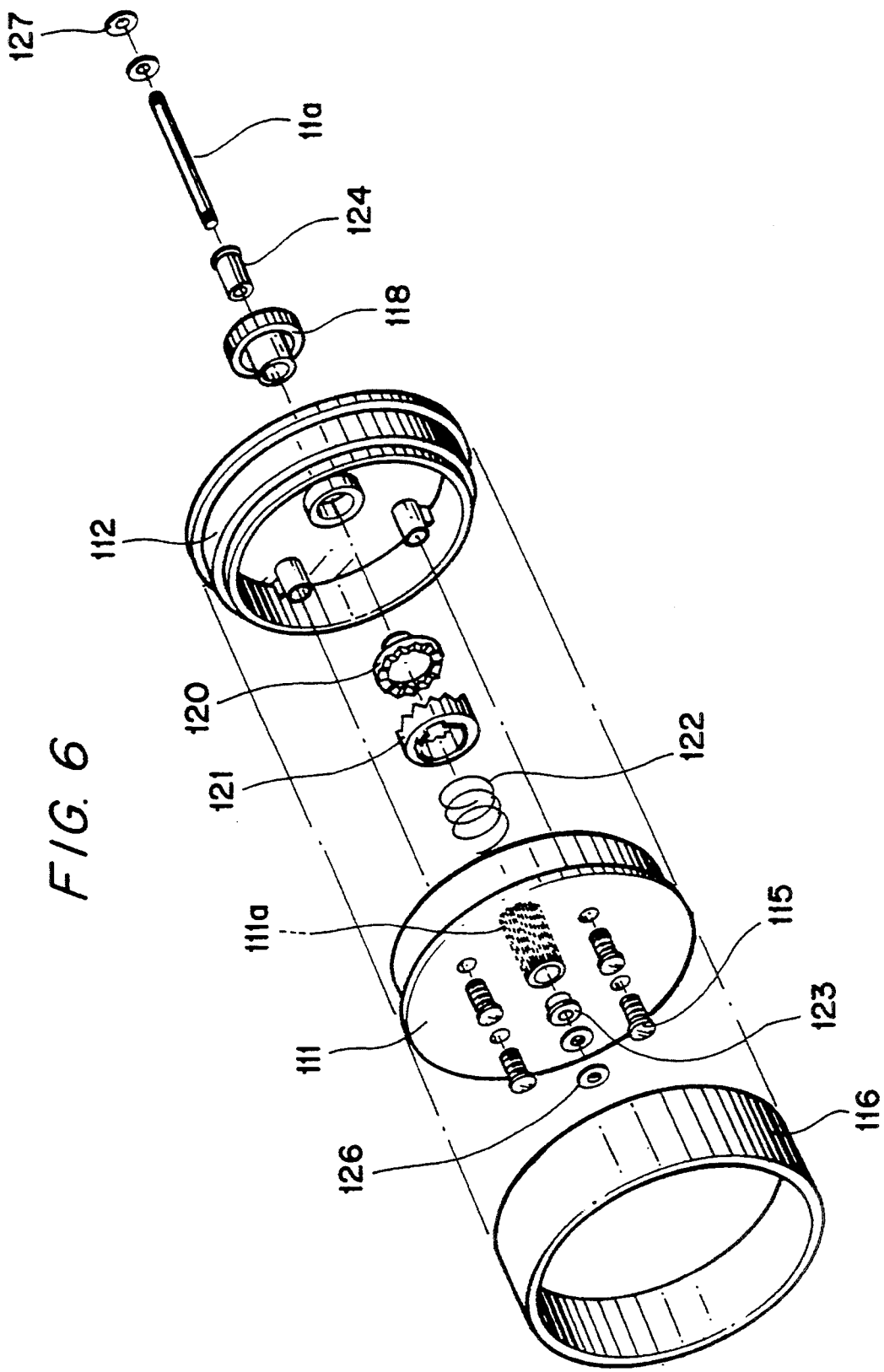
FIG. 6 is an exploded perspective view of a drive wheel employed in accordance with the present invention.

As shown in FIGS. 6 and 7, the drive wheel 11 comprises a first side plate 111 having an inner spline shaft 111a, and a second side plate 112 facing the first side plate 111 and coupled to the first side plate 11 in a fitted manner and by means of set screws 115. The drive wheel 11 further comprises a rubber ring 116 fitted around both the outer peripheral surfaces of the first and second side plates 111 and 112. The rubber ring 116 serves to enhance a frictional force of the drive wheel 11.

The shaft 11a extends through axial openings centrally formed in the first and second side plates 111 and 112. A transmission gear 118 is rotatably fitted in a central portion of the second side plate 112 outwardly of the second side plate 112. The transmission gear 118 is engaged with the smaller gear 167a of the gear 167 so as to rotate the drive wheel 11. A first clutch element 120 is spline-coupled to the transmission gear 118 so as to transmit the drive force of the DC motor 161 to the drive wheel 11.

A second clutch element 121 is spline-fitted to a spline shaft 111a of the first side plate 111. The second clutch element 121 is resiliently supported by a spring 122 such that it can slide along the spline shaft 111a. By the spring 122, the second clutch element 121 is normally engaged with the first clutch element 120 so as to transmit the drive force of the DC motor 161 to the drive wheel 11. When the robot is externally subjected to an overload such as an impact, the spring 122 is compressed, thereby causing the second clutch element 121 to side away from the first clutch element 120. As a result, a power transmission through the clutch 120 and 121 is shut off.

For achieving a smooth rotation of the drive wheel 11, a pair of bushings 123 and 124 are provided at both ends of the shaft 11a, respectively. Outwardly of the bushings 123 and 124, washers 126 and 127 are fitted around both ends of the shaft 11a so as to prevent the shaft 11a from being separated from the drive wheel 11, respectively.

Figure 8C:
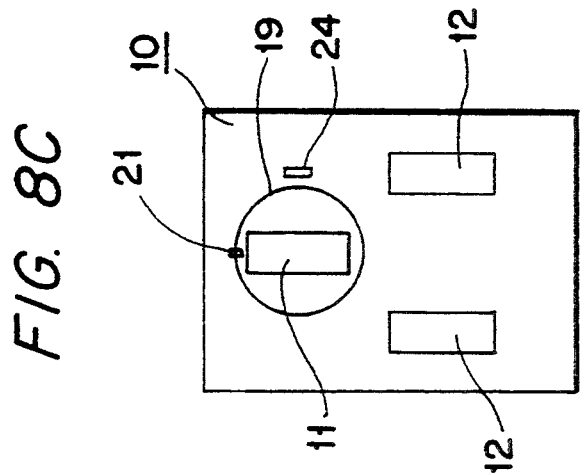
FIG. 8A to 8C explain an initial operation of the robot in which the robot driving apparatus in accordance with the embodiment of the present invention is employed.
Figure 8B:
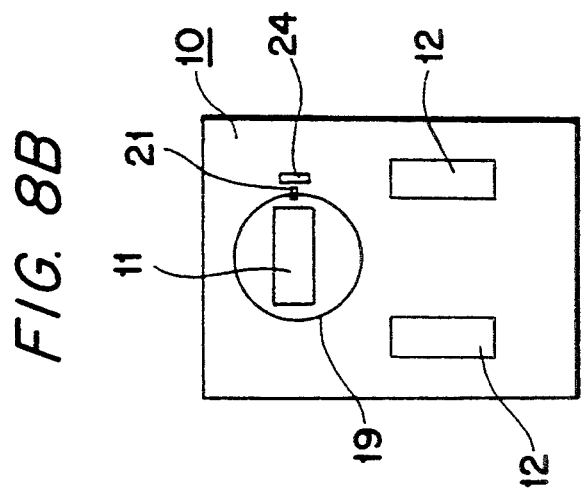
Figure 8A:
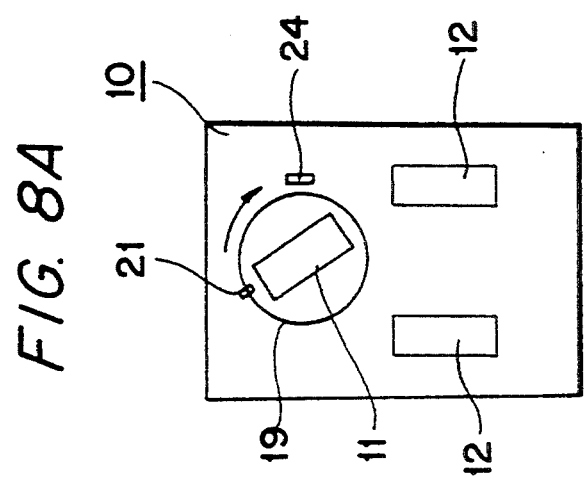

Operation of the robot driving apparatus according to the present invention will now be described.

Where the robot operates at a state that the drive wheel 11 is positioned at an optional position, for example, shown in FIG. 8A, the DC motor 151 of the direction change unit 15 is driven until the magnet 21 attached to the outer peripheral surface of ring gear 19 is aligned with the position sensor 24 attached to the base plate 13, as shown in FIG. 8B.

As the DC motor 151 is driven, the worm 153 and the gear 158 rotate. By the rotation of the worm 158, the ring gear 19 rotates because the teeth 19a formed at the outer peripheral surface of the ring gear 19 are engaged with the smaller gear 158a of the worm gear 158. As result, the cover member 14 coupled with the ring gear 19 rotates, so that the drive wheel 11 mounted to the cover member 14 turns about the base plate 13.

Since the retainer 18 having a plurality of balls 18a is interposed between the base plate 13 and the cover member 14, the cover member 14 and thus the drive wheel 11 can rotate smoothly about the base plate 13. In particular, the cover plate 14 can rotate smoothly without rolling, by virtue of the guide grooves 13c and 14c respectively formed the lower surface of base plate 13 and the upper surface of cover member 14 to guide the balls 18a, as shown in FIG. 5.

When the magnet 21 is aligned with the position sensor 24, as shown in FIG. 8B, the position sensor 24 senses a magnetic line of force from the magnet 21 and sends a sensing signal to a controller not shown. Under a control of the controller, the DC motor 151 then rotates reversely so that the drive wheel 11 turns 90° reversely to be positioned at a reference position where it can move straight, as shown in FIG. 8C.

At this time, the 90° turn of the drive wheel 11 by the DC motor 151 of direction change unit 15 is detected by the revolution sensor 22 mounted to the base plate 13. That is, the revolution sensor 22 detects a magnetic line of force generated from the magnet 159 mounted to the end of the worm 153 away from the DC motor 151 and sends a corresponding signal to the controller which, in turn, detects the 90° turn of the drive wheel 11.

Once the drive wheel 11 is positioned at the reference position, according to the operation of the direction change unit 15, it can move forwards and backwards, according to the drive unit 16.

In other words, as the DC motor 161 is driven, the worm 162 and the gear 167 rotate. By the rotation of the gear 167, the smaller gear 167a fixed to the gear 167 rotates, so that the transmission gear 118 engaged with the smaller gear 167a rotates. As a result, the first clutch element 120 spline-coupled to the transmission gear 118 rotates. By the rotation of the first clutch element 120, the second clutch element 121 engaged with the first clutch element 120 rotates, thereby causing the spline shaft 111a to rotate. Consequently, the first and second side plates 111 and 112 rotate to move the drive wheel 11 forwards or backwards.

When an overload such as an impact is externally applied to the drive wheel 11, the second clutch element 121 slides away from the first clutch element 120 against the spring force of the spring 122 while compressing the spring 122. Accordingly, the second clutch element 121 is disengaged from the first clutch element 120, so that a transmission of the excessive load to the worm gear 167, the worm 162 and the DC motor 161 via the first clutch element 120 is shut off. As a result, the drive wheel 11 idles.

Since impact can not be transmitted to the gear 167 and the DC motor 161, it is possible to avoid a failure caused by a damage of gears.

Figure 9A:
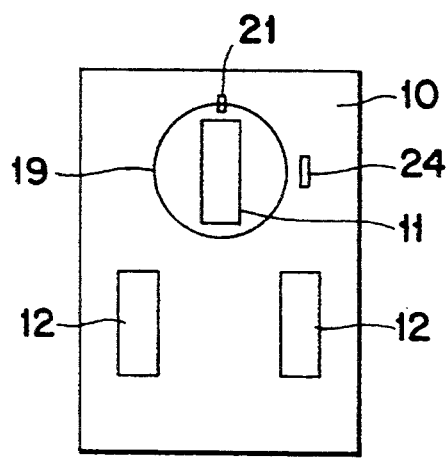
FIG. 9A to 9D explain a direction change operation of the robot in which the robot driving apparatus in accordance with the embodiment of the present invention is employed.
Figure 9B:
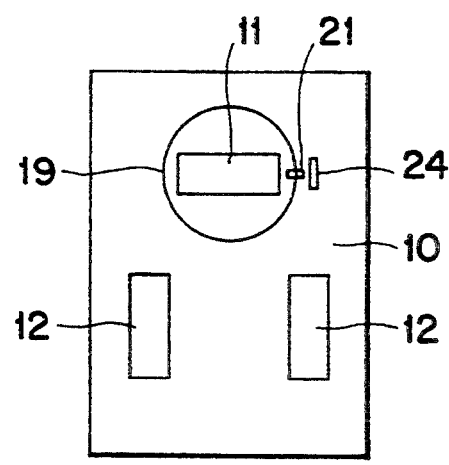
Figure 9C:
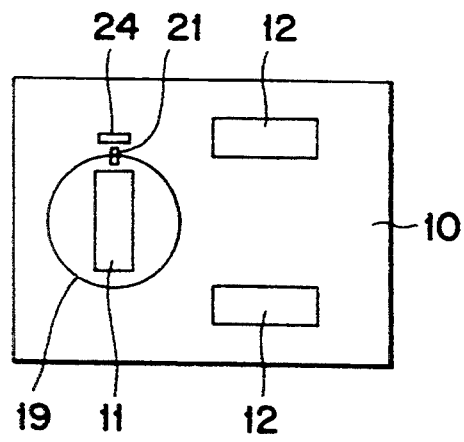

A direction change for turning the drive wheel 11 left or right is achieved by detecting revolutions of the worm 153 caused by the operation of the DC motor 151 of the direction change unit 15 and then controlling the revolutions of the DC motor 151, based on the detected revolutions of the worm 153. That is, the revolutions of the worm 153 are sensed by the revolution sensor 22 which, in turn, sends a corresponding detect signal to the controller not shown. Based on the detect signal, the controller controls the revolutions of the DC motor 151. Thus the robot body 10 can turn through a desired angle, as shown in FIGS. 9A to 9C.

Figure 9D:
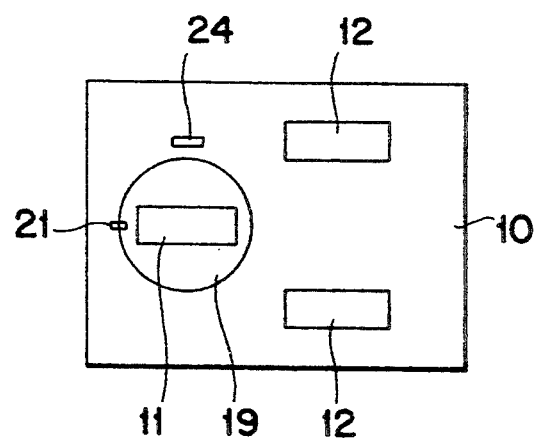

After such a direction change is completed according to the operation of the direction change unit 15, the drive wheel 11 is positioned at its initial drive position where it can move forwards and backwards, as shown in FIG. 9D.

As apparent from the above description, the robot driving apparatus according to the present invention controls a single drive wheel so that the robot can move forwards and backwards and change its direction in right and left. Accordingly, the robot driving apparatus can drive the robot accurately and yet have a simple construction. The simple construction makes it possible to provide an easy assembling work and thus an improvement in working efficiency. As a result, the manufacture cost can be considerably reduced.

Various performance tests for the driving apparatus can be made under a condition that the apparatus has been assembled into a single unit. Accordingly, the overall characteristic tests can be easily achieved. In accordance with the present invention, a power transmission is accomplished by use of a spring-loaded clutch mechanism. When an overload is externally applied to the driving apparatus, the clutch mechanism shuts off a power transmission by virtue of the spring compressed by the applied excessive load. It is possible to prevent a failure due to a damage of transmission means and thus lengthen the use life.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A self-propelled robot capable of forward and backward movement and changing directions during such movement, comprising:
   a robot body having a ring-shaped base plate;
   a cover member disposed within said base plate and including an outer peripheral portion situated beneath said base plate and rotatably mounted thereto about a vertical axis;
   a drive wheel mounted to said cover member for rotation about a horizontal axis of rotation;
   a ring gear affixed to said cover member for rotation therewith and situated over said base plate such that a portion of said base plate is interposed between said cover member and said ring gear; steering drive means for rotating said ring gear to turn said drive wheel about said vertical axis; and
   propulsion drive means for rotating said drive wheel about said axis of rotation for propelling said robot selectively forward and backward.

2. A robot according to claim 1, wherein said propulsion drive means is rotatable with said cover member about said vertical axis.

3. A robot according to claim 1, wherein said steering drive means is mounted on said base plate.

4. A robot according to claim 1, including means rotatably mounting said cover member for rotation about said vertical axis, comprising a retainer situated between said base plate and said cover member and carrying a plurality of ball bearings.

5. A robot according to claim 4, wherein each of said base plate and cover member includes a guide groove in which said ball bearings are disposed.

6. A robot according to claim 1, wherein said second drive means includes a clutch mechanism which automatically disengages the propulsion drive to said drive wheel in response to said drive wheel encountering excessive resistance to travel.

7. A robot according to claim 6, wherein said drive wheel includes an internal spline shaft arranged coaxially with said axis of rotation, said clutch mechanism comprising first and second clutch elements, said first clutch element being disposed within said drive wheel and rotated by said propulsion drive means about said axis of rotation, said second clutch element being slidably mounted on said spline shaft for being rotatable therewith, said first and second clutch elements including mutually facing surfaces having interengageable teeth, and spring means yieldably biasing said second clutch element against said first clutch element to engage said teeth in driving relationship.

8. A robot according to claim 1, wherein said steering drive means comprises a motor mounted on said base plate, a worm driven by said motor, gear means including two coaxial gears operably coupled to said worm and ring gear, respectively.

9. A robot according to claim 8 including a magnet attached to said worm for generating a line of force, and a revolution sensor attached to said base plate for sensing said line of force to sense revolutions of said motor.

10. A robot according to claim 8, wherein said motor constitutes a first motor, said worm constitutes a first worm, and said gear means constitutes a first gear means, said propulsion drive means comprising a second motor mounted to said cover member, a second worm driven by said second motor, and second gear means including two coaxial gears operably coupled to said second worm and a shaft of said drive wheel, respectively.

11. A robot according to claim 1, wherein said propulsion drive means comprises a motor mounted to said cover member, a worm driven by said motor, and gear means including two coaxial gears operably coupled to said worm and a shaft of said drive wheel, respectively.

12. A robot according to claim 1 including a magnet mounted to said ring gear, and a sensor mounted to said base plate for sensing said magnet to define a selected position of said drive wheel.

13. A self-propelled robot capable of forward and backward movement and changing directions during such movement, comprising:
 a robot body;
 a cover member mounted to said robot body for rotation about a vertical axis;
 a drive wheel mounted to said cover member for rotation about a horizontal axis of rotation;
 a steering drive means for turning said cover member about said vertical axis; and
 propulsion drive means for rotating said drive wheel about said axis of rotation, comprising:
  a motor;
  a first clutch element operably coupled to said motor and being rotatable about said axis of rotation, said first clutch element including a first surface having first teeth thereon,
  a second clutch element disposed within said drive wheel and mounted on a splined shaft of said drive wheel for sliding movement therealong, said second clutch element having a second surface facing said first surface and having second teeth, and
 spring means yieldably biasing said second clutch element toward said first clutch element for interengaging said first and second teeth and permitting said first and second teeth to disengage when said drive wheel encounters excessive resistance to travel.

* * * * *